Jan. 26, 1943. A. R. NOBBS 2,309,414
DAMPING MAGNET SYSTEM
Filed April 30, 1940
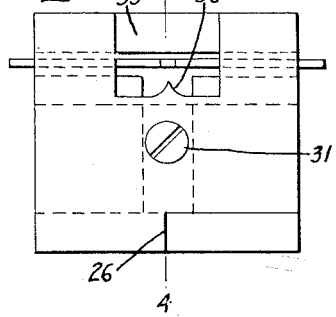
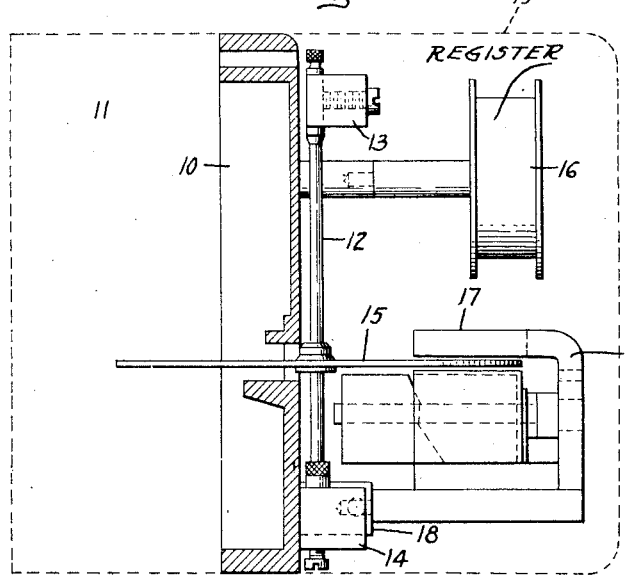
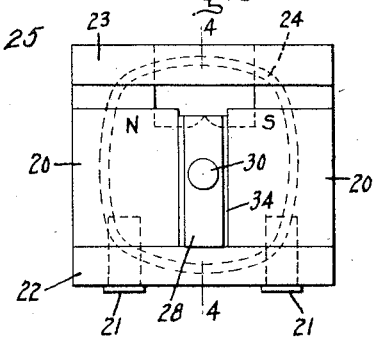
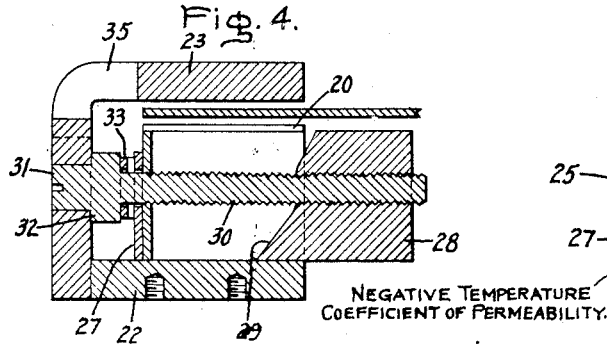
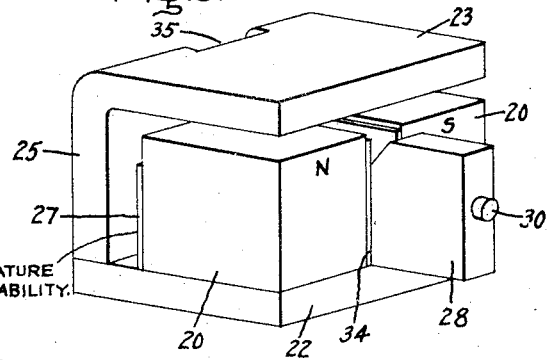
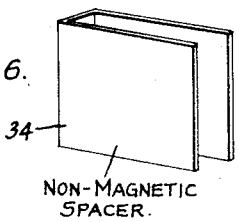
Inventor:
Albert R. Nobbs,
by Harry E. Dunham
His Attorney.

Patented Jan. 26, 1943

2,309,414

UNITED STATES PATENT OFFICE 2,309,414

DAMPING MAGNET SYSTEM

Albert R. Nobbs, Peterborough, Ontario, Canada, assignor to General Electric Company, a corporation of New York Application April 30, 1940, Serial No. 332,505
In Canada October 24, 1939

3 Claims. (Cl. 171—264)

My invention relates to electric meters of the induction disc type, and more particularly to damping apparatus therefor.

Induction disc meters comprise a rotatable conducting disc and an electromagnetic driving system energized from the source of power to be measured acting thereon whereby the amount of rotation of the disc is utilized to give a measure of the power consumed in the circuit. It is customary to provide a damping apparatus comprising a permanent magnet cooperating with the disc to provide a drag thereon and stabilize the operation.

It is an object of my invention to provide a damping magnet which shall be compact in structure, economical in manufacture, and satisfactory in operation.

The speed of rotation of an induction meter disc has a tendency to vary with the temperature of the meter, to run faster as the temperature rises. It has been proposed to correct this temperature error by applying to the damping magnet structure a fixed shunt of material having a negative temperature coefficient of permeability whereby the drag of the magnet is increased with rising temperature and compensates for the tendency to run too fast. It is an object of my invention to incorporate such a temperature compensation device in my damping magnet in a simple, effective and novel manner.

It is customary to calibrate induction disc meters by varying the effectiveness of the damping magnet on the disc. One manner in which this has been accomplished is to mount a piece of soft iron adjacent the magnet poles and provide means whereby the piece may be adjusted in position with respect to the poles, whereby a greater or less amount of the permanent magnet flux is diverted from the magnetic path acting on the disc. It is an object of my invention to provide such a compensating shunt as a part of my damping magnet structure in such a manner as to provide a simple, compact and effective unit which will provide straight line adjustment.

The objects and advantages of my invention will be more completely appreciated from a consideration of the following detailed description taken in connection with the drawing, in which the same reference characters refer to the same parts throughout the several views, and in which:

Figure 1 is a general view of an induction meter with the damping magnet apparatus of my invention located in operative position;

Figure 2 is an end view of my damping magnet apparatus, looking from the right of Fig. 1 towards the axis of the disc;

Figure 3 is an end view from the opposite end from Fig. 2;

Figure 4 is a central, longitudinal, cross-sectional view on the line 4—4 of Figures 2 and 3;

Figure 5 is a perspective view of the magnet; and

Figure 6 is a perspective view of a spacer employed.

Referring to the drawing, and particularly Figure 1, reference character 10 represents a metal framework on which the operating parts of the meter are mounted. Certain parts, including an electromagnetic driving system for the disc, are mounted on the frame 10 and are enclosed within a metal housing 11 secured to the frame 10 in the customary manner. These parts are not shown, as they form in themselves no part of my present invention. A spindle 12 is mounted on brackets 13 and 14 and this spindle carries a thin disc 15 of conducting material, such as aluminum. The disc 15 extends into the casing 11 in cooperating relation with an electromagnetic driving system. Rotation of the disc by the driving system actuates a register, generally shown at 16.

The damping magnet apparatus of my invention, generally indicated by the reference character 17, is detachably mounted in a definite position on a bracket 18 extending from the frame 10. The customary removable glass cover 19 is shown in dotted lines.

The damping magnet consists of a pair of blocks of magnetic material 20, mounted for example by means of rivets 21 at the inside of one arm 22 of a U-shaped yoke of cold rolled steel and spaced apart laterally along the edge of the arm approximately equidistant from the neck 25 of the yoke. The other ends of the magnets extend close to the other arm 23 of the yoke so that when the structure is mounted on the bracket 18, as indicated in Fig. 1, the disc 15 is centrally located in the gap between the permanent magnet blocks 20 and the leg 23 of the yoke. The yoke arms 22 and 23 extend radially inward with respect to the meter disk 15 and the neck 25 of the yoke is radially outward. The pair of magnets are mounted with their ends of opposite polarity in contact with the arm 22 and their polarity is indicated in Fig. 3. The magnetic circuit is indicated by the dotted line 24. It will be observed that the lines of flux extend across the gap in which the disc is located from one magnet to one end of the armature constituted by the leg 23 of the yoke and then from the other end of the armature 23 across the air gap to the other magnet. The magnetic circuit is completed at the lower end of the magnet by the lower leg 22 of the bracket.

The permanent magnets 20 are relatively short in comparison with their cross-sectional area and the length of the air gaps and are composed of a high coercive force material, such for example as is available under the trade name "alnico." The high coercive force permanent magnet material is not of itself of my invention. A suitable material is that described in Patent No. 2,027,996, Mishima, or that described in Patent 1,968,569, Ruder.

The yoke, for convenience in manufacture, is made up of a pair of sections, a flat section forming the leg 22, to which the magnets 20 are secured, and an L-shaped section, which is secured thereto in stepped relation as indicated at 26.

For meter temperature compensation, a strip 27 of material having a negative temperature coefficient of permeability is welded to that side of the pair of magnets facing the neck 25 of the yoke. A portion of the flux of the magnets 19 will be shunted through the strip 27. With a rise in temperature, a lesser amount of flux is diverted through the shunt, and consequently a greater amount of flux exists across the gap and is available for damping the disc.

The calibrating adjustment is provided by the adjustable shunt 28 which is mounted in the space between the permanent magnets 20 and is provided with an adjusting arrangement whereby it may be moved into and out of the space. As it is moved into or out of the space between the magnets, a greater or a lesser amount of the available magnet flux is diverted from the air gaps. The entering face of the shunt 28 is bevelled, as shown at 29, so that the increase in effectiveness of the shunt is gradual as it enters between the magnets in such a manner that a straight line adjustment curve is provided; that is, for equal amounts of rotation of the adjusting head to be presently described, equal amounts of change of speed of the meter disc will be obtained. The adjusting mechanism consists of a threaded bolt 30 of brass or other non-magnetic material cooperating with a threaded hole in the shunt 28 and having an adjusting head 31 mounted centrally of the neck of the yoke. The adjusting head 31 is rabbeted, whereby a shoulder 32 engages the inner face of the neck of the yoke and the bolt is biased with the shoulder 32 against the neck of the yoke by means of a bronze spring 33 of general hairpin configuration which is compressed in the space between the bolt head and the strip 27. That section of the bolt 30 adjacent the spring 33 may be reduced in cross-section to accommodate the spring. It is apparent that rotation of the bolt 30, whose head 31 is readily accessible from the front of the meter, will cause the reciprocation of the shunt 28 in the space between the magnets 20. The bevelled entering edge 29 of the shunt provides that approximately equal amounts of rotation of the bolt 30 will provide equal amounts of change of speed of the meter disc and thus facilitate the calibration of the meter.

A U-shaped spacer 34 of thin, non-magnetic material, such as aluminum or brass, is inserted in the gap between the magnets 20 and this spacer serves to mechanically space the shunt 28 from the magnets. The bolt 30 passes freely through openings provided in the spacer 34 and the strip 27.

A portion of the yoke at the angle thereof opposite the disc 15 is cut away to form a window 35 through which the disc may be viewed from the front of the meter. A pointer 36 projecting upwardly from the lower edge of the window cooperates with a mark placed on the edge of the disc to provide a convenient indication in calibrating. The pointer is integral with the material of the yoke and formed in the operation of punching out the window.

It will be apparent from the above description that I have provided a magnet assembly which is small and compact and which will have a low cost of manufacture. The damping magnet, calibration adjustment and temperature compensation are all combined into one unit. Thus, uniform temperature compensation is obtained and removal and reassembly of the magnet from the meter can be had without disturbing the calibration. Straight line calibration is obtained without the necessity of moving the magnet and testing of the meter is simplified by the use of the pointer in the yoke window in conjunction with the mark on the edge of the disc. High coercive force magnet material of a type which substantially increases the immunity of the damping system to the effect of stray fields is used.

I have shown herein and described in detail a specific embodiment of my invention but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A damping magnet for rotating disc devices comprising a pair of relatively short permanent magnets of high coercive force material secured spaced apart on a strip of high permeability material with poles of opposite polarity in contact with the strip, an armature of material of high permeability spaced from the other pole faces of the said magnets to form therebetween a pair of air gaps in which a rotatable disc is adapted to move, and a calibrating adjustment shunt of material of high permeability occupying the space between said magnets and mounted for reciprocation therein, the entering face of the shunt being beveled for gradual increase in effectiveness of the shunt to provide a straight line adjustment curve.

2. A damping magnet for rotating disc devices in accordance with claim 1, in which temperature compensation for said devices is provided by a relatively flat strip of material having a negative temperature coefficient of permeability which extends along and is secured to substantially coplanar side surfaces of said pair of magnets as a shunt.

3. A damping magnet for a rotating disk device comprising a pair of relatively short permanent magnets of high coercive force material secured and spaced apart on a strip of highly permeable material with poles of opposite polarity in contact with the strip, an armature of material of high permeability spaced from the other pole face of the said magnets to form therebetween a pair of air gaps in which a rotatable disk is adapted to move, a calibrating adjustment shunt of material of relatively high permeability occupying the space between said magnets and mounted for reciprocation therein, and non-magnetic sheet material interposed between either side of said adjustment shunt and the adjacent side surfaces of said magnets for separating said shunt mechanically from said magnets.

ALBERT R. NOBBS.